Patented Apr. 21, 1925.

1,534,518

UNITED STATES PATENT OFFICE.

ARMIN GOESCHKE, OF BASEL, SWITZERLAND. ASSIGNOR TO SOCIETY OF CHEMICAL INDUSTRY IN BASLE, OF BASEL, SWITZERLAND.

INDOPHENOL SULPHUR DYESTUFFS AND PROCESS OF MAKING SAME.

No Drawing. Application filed June 21, 1924. Serial No. 721,592.

*To all whom it may concern:*

Be it known that I, ARMIN GOESCHKE, a citizen of the Swiss Confederation, and residing at Basel, Switzerland, have invented new and useful Indophenol Sulphur Dyestuffs and Processes of Making Same, of which the following is a full, clear, and exact specification.

The present invention relates to new dyestuffs which are valuable for the production of fast shades on the fibre. It comprises the new dyestuffs, the process of making same, as well as the material dyed with these new dyestuffs.

It has been found that new dyestuffs containing sulfur are obtained by treating with alkali polysulfides the indophenols which may be prepared by condensation of nitrosophenols with diphenylamine derivatives having, on the one hand, at least one $CH_3$-group in ortho-position to the >NH-group, and, on the other hand, at least one free para-position to the same >NH-group, such as for instance o-tolylphenylamine

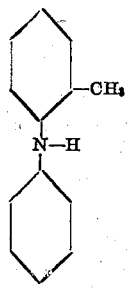

o, o'ditolylamine

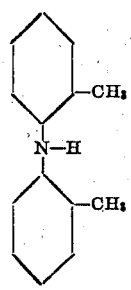

o, o'ditolylamine

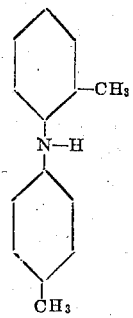

or p'-chloro-o, o'-ditolylamine

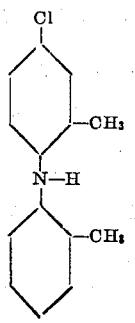

and the like.

The new dyestuffs form dark blue powders, dissolving in sulfuric acid to blue solutions, in alkali sulfide solutions to green, and in alkaline hydrosulfite solutions to brownish-yellow solutions. They dye unmordanted cotton in a sodium sulfide bath or in a hydrosulfite vat pure blue tints which differ from those obtained with the already known dyestuffs from diphenylamine derivatives without the $CH_3$-group in ortho-position in that they are of much better fastness to washing and to boiling soap solutions.

The following examples illustrate the invention, the parts being by weight:—

*Example 1.*

37.6 parts of the indophenol from o-tolylphenylamine and nitrosophenol are introduced, while stirring, into a polysulfide solution obtained from 72 parts of crystallized sodium sulfide and 43 parts of sulfur. The mixture is heated slowly to boiling, thereafter evaporated until the boiling point is 125° C., and then boiled for 12–20 hours in a reflux apparatus. The product of reaction is diluted with water and the dyestuff isolated by acidification or by blowing out with air. The dyestuff thus obtained dyes cotton in a sodium sulfide bath pure greenish-blue shades, fast to washing and boiling soap solutions.

Very similar dyestuffs are obtained if instead of the indophenol from o-tolylphenylamine those from o, o′-ditolylamine, o, p′-ditolylamine, p′-chloro-o, o′-ditolylamine, and the like, are used.

Example 2.

39 parts of the indophenol obtained by condensation of one molecular proportion of a mixture from o, o′-and o, p′-ditolylamine and one molecular proportion of nitrosophenol are introduced, while stirring, into a polysulfide solution obtained from 72 parts of crystallized sodium sulfide and 43 parts of sulfur. The mixture is slowly heated to boiling, thereafter evaporated until the boiling point is 125° C., and then boiled for 12–20 hours in a reflux apparatus. The product of reaction is diluted with water and the dyestuff isolated by acidification or by blowing out with air. The dyestuff thus obtained dyes cotton in a sodium sulfide bath pure greenish-blue shades, fast to washing and boiling soap solutions.

Example 3.

13 parts of the leucoindophenol obtained by reduction of the indophenol from nitrosophenol and o, o′-ditolylamine are boiled for 80 hours in a reflux apparatus with an alcoholic polysulfide solution, prepared from 150 parts of alcohol, 22 parts of calcined sodium sulfide and 24 parts of sulfur. After dilution with water and evaporaiton of the alcohol the dyestuff is blown out. It shows the same properties as those of the dyestuffs of the first two examples.

Example 4.

13 parts of the indophenol from nitrosophenol and o, o′-ditolylamine are introduced, while stirring, into an alcoholic polysulfide solution prepared from 100 parts of alcohol, 14 parts of calcined sodium sulfide and 40 parts of sulfur. The whole is slowly heated to boiling temperature and then boiled for 120 hours in a reflux apparatus. The sulfurized product consists of two dyestuffs. These may be separated by treatment with an aqueous solution of sodium sulfide into one dyestuff soluble in sodium sulfide and corresponding to that of Example 3, and into a second dyestuff, insoluble or soluble with difficulty in sodium sulfide, which latter dyestuff dyes cotton in an alkaline hydrosulfite vat fast greenish-blue shades.

What I claim is:

1. The herein described process of making new blue dyestuffs containing sulfur, fast to washing and boiling soap solutions, consisting in treating with alkali metal polysulfides the indophenols which may be obtained by condensation of nitrosophenols with diphenylamine derivatives having, on the one hand, at least one $CH_3$-group in ortho-position to the >NH-group, and, on the other hand, at least one free para-position to the same >NH-group.

2. The herein described process of making new blue dyestuffs containing sulfur, fast to washing and boiling soap solutions, consisting in treating with alkali metal polysulfides the mixture of indophenols which may be obtained by condensing nitrosophenols with a mixture of o, o′-ditolylamine and o, p′-ditolylamine.

3. As new products the herein described new blue dyestuffs containing sulfur, fast to washing and boiling soap solutions, obtainable by condensation of nitrosophenols with diphenylamine derivatives having, on the one hand, at least one $CH_3$-group in or-tho-position to the NH-group and, on the other hand, at least one free para-position to the same NH-group, which dyestuffs are dark blue powders dissolving in sulfuric acid to blue solutions, in sodium sulfide solution to green, and in alkaline hydrosulfite solution to brownish-yellow solutions, and dyeing unmordanted cotton in a sodium sulfide bath or in a hydrosulfite vat blue shades fast to washing and boiling soap solutions.

4. Material dyed with the dyestuffs of claim 3.

In witness whereof I have hereunto signed my name this 6th day of June, 1924, in the presence of two subscribing witnesses.

ARMIN GOESCHKE.

Witnesses:
 MADELEINE SPENGLER,
 ARMAND NANCE.